Aug. 6, 1957 M. C. SZE 2,801,709
MIST REMOVAL FROM GASES
Filed June 9, 1955 2 Sheets-Sheet 1

INVENTOR.
MORGAN C. SZE
BY Paul W. Garbo
AGENT

Aug. 6, 1957    M. C. SZE    2,801,709
MIST REMOVAL FROM GASES
Filed June 9, 1955    2 Sheets-Sheet 2

INVENTOR.
MORGAN C. SZE
BY Paul W. Garbo
AGENT

United States Patent Office 2,801,709
Patented Aug. 6, 1957

2,801,709

MIST REMOVAL FROM GASES

Morgan C. Sze, Flushing, N. Y., assignor to Hydrocarbon Research, Inc., New York, N. Y., a corporation of New Jersey Application June 9, 1955, Serial No. 514,308

12 Claims. (Cl. 183—34)

This invention relates to process and apparatus for removing liquid including mist from gas containing the same. More particularly, this invention relates to the removal of mist from gas under pressure, such as synthesis gas, so completely that the gas can be passed over a catalyst without poisoning the catalyst or causing any appreciable loss in its activity.

In the synthesis of ammonia for example, the synthesis gas after passage through the gas compressor invariably contains some oil, usually in the form of mist. It is imperative that this oil be removed before the gas is passed over the catalyst in order to avoid poisoning of the catalyst or loss in its activity. For this purpose it was heretofore conventional practice to pass the gas leaving the compressor through an oil separator containing cloth filters, Raschig ring packing, etc. These and other type oil separators heretofore available are inefficient and otherwise unsatisfactory in that they do not result in the desired separation of oil mist from the gas to permit flow of the gas over the catalyst without deleteriously affecting the latter. Also, if oil removal is incomplete, the ammonia produced wil lbe contaminated with traces of oil.

It is among the objects of this invention to provide a novel process of separating the liquid including mist from gases containing the same which is unusually efficient in operation and results in the substantially complete removal of the liquid, so much so, that in the case of synthesis gas, the gas leaving the separator can be passed over the catalyst without deleteriously affecting its activity.

It is still another object of this invention to provide a separator for effecting removal of liquid including mist from gas containing the same, which separator is unusually simple and compact in design and efficient in operation.

Other objects and advantages of this invention will be apparent from the following detailed description thereof.

In accordance with the process aspects of this invention the gas containing liquid and under any suitable pressure in excess of the pressure drop through the separator, say at a pressure of about 15 pounds per square inch gauge or higher, usually at a pressure of 300 to 4,000 pounds per square inch, is in the preferred embodiment, first caused to flow in a desired circuitous path to subject the gas to centrifugal force and thereby cause larger particles of liquid to coalesce and drop out of the flowing gas stream. In those cases in which the gas is substantially free of such larger particles or contains only fine mist, this step need not be employed. Thereafter the gas is passed through a plurality of zones desirably arranged in zigzag relationship. Each zone is provided with a scrubber unit constituted in the direction of gas flow of first an orifice plate provided with a plurality of orifices through which the gas flows, secondly an impact plate which has an impact surface or area opposite each orifice, which area or surface is positioned in closely spaced relationship to each orifice of the orifice plate and thirdly, one or more collector plates. Thus, the gas in passing through each orifice contacts the impact surface, changes its direction of flow, and passes through the impact plate through openings adjacent the impact surfaces. The flow of the gas through orifices into contact with the impact surfaces and the change in direction of the gas flow effects coalescence of the mist and thus converts smaller liquid particles into larger particles. From the impact plate the gas flows through the closely-spaced small openings in the collector plate or plates. Preferably a plurality of such collector plates are employed with the openings of the respective plates aligned in the direction of gas flow. As the gas flows through the multiplicity of small openings in the collector plate or plates, the liquid conditioned as hereinabove described settles out on to the walls of the collector plate or plates and drains therealong. In this way the liquid is removed continuously so that it is not reentrained by the gas.

The orifice plates of the respective scrubber units in the direction of gas flow are constructed so that the velocity of the gas is increased progressively as it flows through a succeeding zone from a preceding zone; desirably this increase in velocity is in increments of about 20%, i. e., the velocity in the second zone is about 20% greater than in the first zone, that in the third zone is about 20% greater than that in the second zone, etc. This increase in velocity may be effected in any one of a number of ways, such, for example, as decreasing the number of orifice openings in the orifice plates of successive zones while keeping the individual openings therein of a constant size, or reducing the size of the openings in the orifice plates of succeeding zones.

By having each scrubber unit designed as hereinabove described and progressively increasing the velocity of the gas flowing through each succeeding unit relative to the gas velocity through a preceding unit and employing a suitable number of scrubbing zones, say 3 or more and preferably about 5, by the time the gas reaches the final scrubbing zone of the series even the finest mist is caused to coalesce and the larger liquid particles thus formed are removed in the flow of the gas through the collector plate or plates associated with the final or exit scrubbing unit.

In the preferred embodiment illustrated in the drawings, the invention is shown incorporated in an oil separator having five scrubbing units arranged in zigzag relationship and the description which follows will largely be confined to the present illustrated embodiment of the invention. It will be understood, however, that the novel features and improvements are susceptible to other applications, such as the removal of acid mists from gases, as well as to separators involving a different number and arrangement of scrubbing units than that disclosed.

In the accompanying drawings forming a part of this specification and showing a preferred form of this invention without limiting the claimed invention to such illustrative instance:

Figure 1:
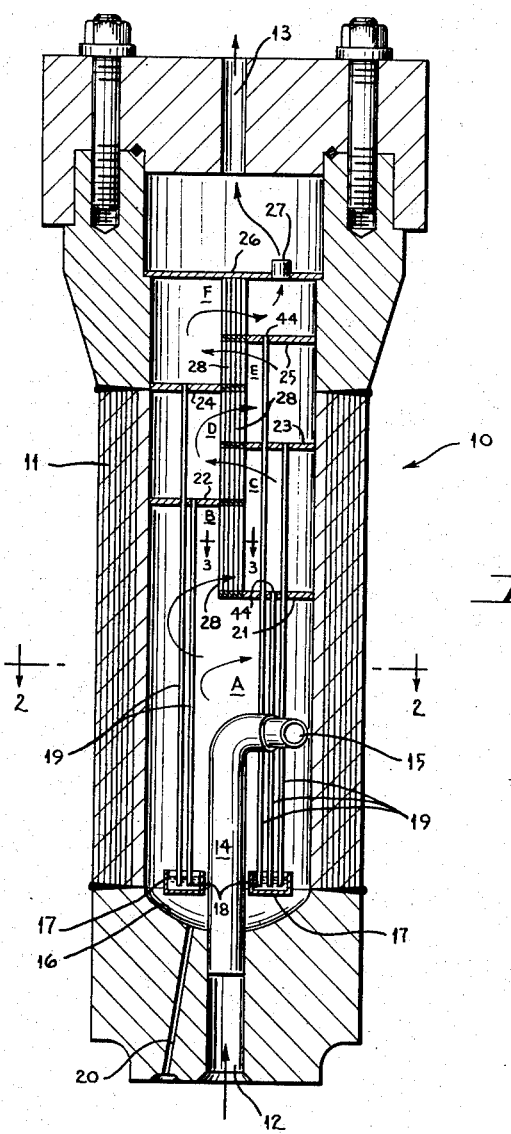
Figure 1 is a vertical section through an oil-gas separator.

The oil-gas separator comprises a housing 10 which has a generally cylindrical wall 11 and is provided with a gas inlet 12 at its base and an outlet 13 at its top. The oil-gas separator, as disclosed, is designed to withstand pressures of the order of 4,000 pounds per square inch and is therefore of relatively massive construction. However, other suitable housing shapes and structures may, of course, be used depending on the desired service.

Communicating with the inlet 12 is a pipe 14 having its discharge outlet 15 disposed to discharge gas in a generally tangential direction relative to cylindrical wall 11 of housing 10. Outlet 15 is disposed above base 16 to provide ample space for seal cups 17, which seal discharge ends 18 of drain pipes 19, the function of which will be hereinafter described. Base 16 of housing 10 is provided with outlet drain 20 for removal from base 16 of liquid which overflows from seal cups 17.

Disposed above inlet pipe 14 are horizontal baffle plates 21, 22, 23, 24 and 25. Plates 21, 23 and 25 extend from the right-hand wall, viewing Figure 1, toward the opposite wall a distance somewhat greater than the radius of the cylindrical wall 11. Baffles 22 and 24 extend a like distance from the left-hand wall viewing Figure 1, towards the opposite wall. Thus, these baffles divide the oil-gas separator into a centrifugal separation zone A and successive scrubber zones B, C, D, E and F. The lower and upper limits of zone B are defined by baffles 21, 22; those of zone C by baffles 22, 23; those of zone D by baffles 23, 24; those of zone E by baffles 24, 25; and those of zone F by baffle 25 and a top plate 26 provided with a discharge opening 27. Scrubber zones B, C, D, E and F, as shown in Figure 1, provide intercommunicating zigzag zones through which the gas flows in series.

Disposed in each of these zones and extending from a lower baffle to the next higher baffle is a scrubber unit 28. These units 28 are vertically positioned along the axis of housing 10. Since scrubber units 28 are all of essentially like construction, only one will be described in detail.

Refering to Figures 3 to 7, each scrubber unit 28 comprises in the order mentioned and in the direction of gas flow therethrough an orifice plate 29, an impact plate 30 and three collector plates 31, 32 and 33.

Figure 4:
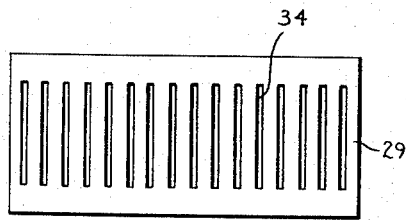
Figure 4 shows the face of the orifice plate of the scrubber unit of Figure 3.
Figure 5:
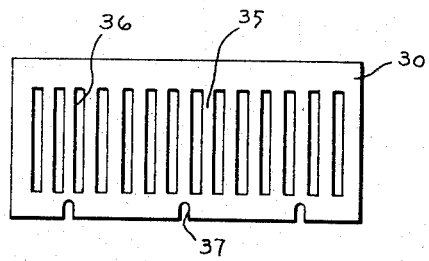
Figure 5 shows the face of the impact plate of the scrubber unit of Figure 3.

As is evident from Figure 4, orifice plate 29 is provided with a plurality of spaced narrow slots 34 constituting the orifices. In the embodiment of the invention shown in the drawings, the orifice plate is ⅛ inch thick and slots 34 are 1/16 inch wide. The length of slots 34 depends on the number and width of these slots as well as the desired gas flow rate through unit 28. It will be understood that the thickness of plate 29, the size of slots 34 and their arrangement including their spacing may be varied as desired, and that instead of the elongated slots, small orifices in the form of circular or other shaped openings, may be used.

Disposed directly in back of orifice plate 29 and spaced therefrom by a small clearance of the order of 1/16 inch, is impact plate 30. This plate 30 provides impact surfaces 35 directly opposite orifices 34 in plate 29. In the embodiment of the invention shown in the drawing, impact plate 30 has a thickness of ¼ inch and is provided with slots 36 of ⅛ inch width on opposite sides of impact surfaces 35 which are at least double the width of orifices 34. The base of impact plate 30 is provided with spaced notches 37, the function of which will be pointed out hereinafter.

Figure 3:
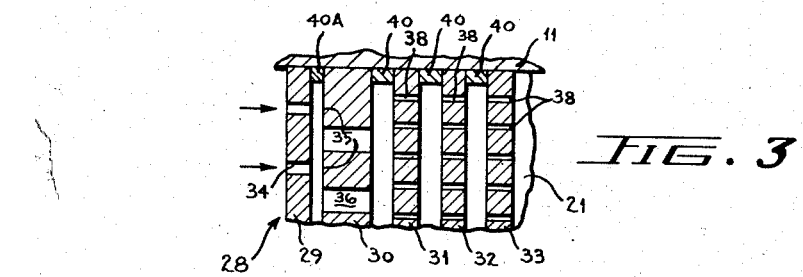
Figure 3 is a fragmentary, enlarged detail showing a horizontal section through a scrubbing unit, the direction of flow through this unit is indicated by the arrows appearing in this figure.
Figure 2:
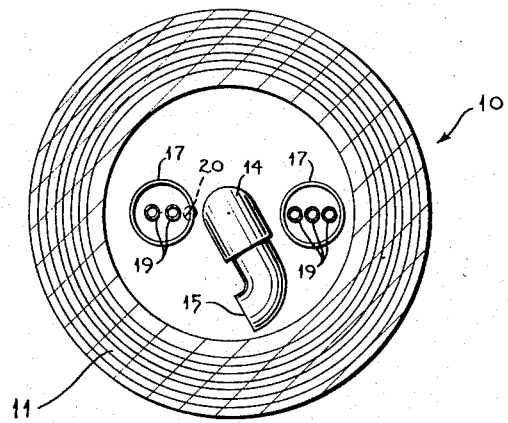
Figure 2 is a horizontal section taken in the plane passing through line 2—2 of Figure 1.
Figure 6:
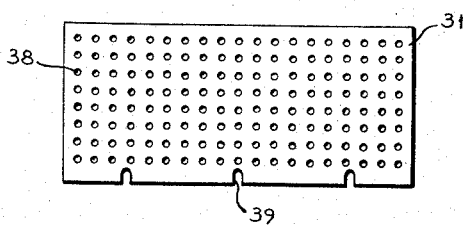
Figure 6 shows the face of a collector plate of the scrubber unit of Figure 3.

Each of collector plates 31, 32 and 33 is provided with a multiplicity of openings 38, as shown in Figure 6. Circular openings 38 are arranged in aligned rows, i. e., not staggered, and have a diameter of 1/12 inch. The number of these openings 38 is as large as possible consistent with the mechanical strength of collector plates 31, 32 and 33. Openings 38 in collector plates 31, 32 and 33, as shown in Figure 3, are aligned in the direction of gas flow. In this way, re-entrainment of liquid removed from the gas as it flows through the collector plates is minimized. The base of each collector plate is provided with spaced notches 39 similar to notches 37 in impact plate 30.

Figure 7:
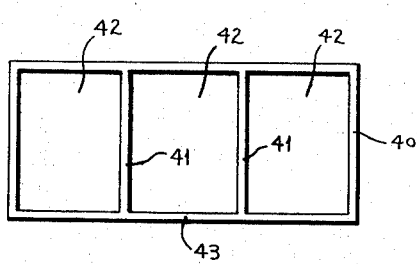
Figure 7 shows the face of a spacer used between the plates of the scrubber unit of Figure 3.

Spacer plates 40, as shown in Figure 7, are in the form of a rectangular frame having transversely extending braces 41 for strengthening this frame. The areas 42 in this frame are open for flow of gas therethrough. Spacer plates 40 are ⅛ inch thick and, as shown in Figure 3, are disposed between impact plate 30 and collector plate 31 and between adjacent collector plates which are each ⅛ inch thick. Impact plate 30 is spaced from orifice plate 29 by spacer plate 40A which differs from spacer plates 40 only in being thinner.

Notches 37 in impact plate 30 and notches 39 in collector plates 31, 32 and 33 are deeper than base member 43 of spacer plates 40. Thus, base member 43 may be 1 inch high and notches 37 and 39 may be 1½ inches high so that liquid flowing down the collector plates onto base member 43 may drain away through notches 37 and 39. Ultimately the liquid drains onto the baffle which is disposed along the lower edge of the scrubber unit. The liquid then flows from each horizontal baffle through an opening 44 and drain pipe 19 into a seal cup 17, as shown in Figure 1. Seal cups 17 prevent flow of gas up through drain pipes 19, the gas flowing in the direction indicated by the arrows in Figure 1.

The scrubber units in the successive zones B, C, D, E and F differ from each other in that the orifice plates are so designed that the velocity of the gas flowing through the successive zones increases progressively in the direction of gas flow. Desirably, this increase is at least about 20% from one zone to the next. For example, in one embodiment of the invention, the separator is so designed that the velocity of the entering gas based on the cross-section of zone A is approximately 0.5 foot per second and the velocities through the orifice plates of zones B, C, D, E and F, respectively, are approximately 12, 15, 19, 25 and 36 feet per second. This increase in velocity may be effected by using orifice plates of progressively decreasing height in the direction of gas flow. Alternatively, the number and/or size of the orifices in the orifice plates may be made progressively smaller from one orifice plate to the next in the direction of gas flow while keeping the overall size of the plates the same, thus effecting the desired increase in gas velocity.

In the operation of the separator of this invention, large oil droplets are removed from the gas in zone A due to the centrifugal force to which the gas is subjected as it enters this zone tangential to the walls defining it. From zone A the gas flows into scrubber zone B wherein liquid drops or particles larger than about 12 microns in diameter are removed. Progressively smaller oil drops are removed in the succeeding scrubber zones C, D, E and F until substantially all drops larger than 7 microns in diameter are eliminated from the gas.

The oil mist is separated from the gas by coalescence taking place chiefly as the gas flows through the orifices and impinges on the impact surfaces which change the direction of gas flow. Oil drops carried by the gas through the openings in the impact plate tend to settle on the collector plates. The coalesced oil runs down the collector plates and flows along the horizontal baffles to the drain openings 44.

In actual operation, the foregoing illustrative oil-gas separator removes approximately 1 pint of oil per hour from ammonia synthesis gas leaving an oil-lubricated compressor at the hourly rate of 1,500,000 cubic feet measured at standard conditions. The liquid ammonia produced from the gas after passage through the separator of this invention contain less than 1 part per million of oil. A piece of filter paper held for several minutes against the gas leaving the separator fails to show an oil stain. The performance of this oil-gas separator is markedly better than oil filters or separators heretofore known.

The cylindrical wall of the oil-gas separator shown in the drawings has a multilayer construction to withstand high pressure service. Depending on the intended use of the separator, construction with a single metal sheet may be adequate. While the foregoing example gave specific dimensions for the various elements of the separator, it may be helpful to indicate the dimension ranges which are most generally satisfactory for eliminating mists from gases. Referring to the drawings, these ranges are:

| | |
|---|---|
| Orifice plate 29 | 3/32 to 3/16 inch thick. |
| Spacer plate 40A | 1/16 to 3/32 inch thick. |
| Impact plate 30 | 3/16 to 5/16 inch thick. |
| Collector plates 31, 32 and 33 | 1/16 to 1/4 inch thick. |
| Spacer plates 40 | 3/32 to 1/4 inch thick. |
| Orifice slots 34 | 1/32 to 3/16 inch wide. |
| Impact slots 36 | 1/16 to 3/8 inch wide. |
| Collector holes 38 | 1/16 to 1/4 inch diameter. |

In the centrifugal separation zone A, a gas velocity of about 0.3 to 1.2 feet per second is generally employed, while a velocity of at least 10 feet per second is maintained through the orifice plate of the first scrubber zone B. For good design, the gas velocity through the orifice plates of the several scrubber zones is generally increased as follows:

| | Feet per second |
|---|---|
| Scrubber zone B | 10 to 15 |
| Scrubber zone C | 12 to 20 |
| Scrubber zone D | 15 to 25 |
| Scrubber zone E | 20 to 35 |
| Scrubber zone F | 30 to 50 |

Since certain changes may be made in the process and the mist separator of this invention without departing from its spirit or scope, it is intended that all matter contained in the description or shown in the accompanying drawings shall be interpreted as illustrative and not in a limiting sense.

What is claimed is:

1. A process of separating a liquid mist from a gas containing the same, which comprises flowing said gas through a plurality of scrubbing zones while progressively increasing the velocity of said gas in its flow through each succeeding zone relative to its velocity in the preceding zone and in each zone flowing said gas first through a plurality of orifices into contact with impact surfaces causing a change in direction of gas flow, then through openings adjacent said impact surfaces and thereafter through a series of collection openings disposed in closely-spaced relationship downstream with respect to said openings adjacent said impact surfaces, the contact of said gas with said impact surfaces effecting coalescence of smaller liquid mist particles thereon and the formation of larger liquid particles which are removed from said gas as it flows through said series of collection openings.

2. The process of claim 1 wherein said gas flows through the orifices of the first scrubbing zone at a velocity of at least 10 feet per second and through the orifices of each succeeding zone at a velocity of at least 20% greater than that of the preceding zone.

3. The process of claim 2 wherein said gas flows through the orifices of the last scrubbing zone at a velocity of at least 30 feet per second.

4. A process of separating an oil mist from a gas containing the same, which comprises flowing said gas at a pressure of 300 to 4,000 pounds per square inch through a plurality of scrubbing zones while progressively increasing the velocity of said gas in its flow through each succeeding zone relative to its velocity in the preceding zone and in each zone flowing said gas first through a plurality of orifices into contact with impact surfaces causing a sharp change in direction of gas flow, then through openings adjacent said impact surfaces and thereafter through a series of aligned collection openings disposed in closely-spaced relationship downstream with respect to said openings adjacent said impact surfaces, the contact of said gas with said impact surfaces effecting coalescence of smaller oil mist particles thereon and the formation of larger oil particles which are removed from said gas as it flows through said series of aligned collection openings, the oil thus removed being drained from said scrubbing zones so that it is not reentrained by said gas.

5. The process of claim 4 wherein said gas first passes in a circuitous path to drop out by centrifugal force the larger oil mist particles and then flows through the orifices of the first scrubbing zone at a velocity of at least 10 feet per second.

6. A separator for removing fine liquid particles from a gas, comprising, in combination, a housing containing a cylindrical chamber, means for introducing a gas into said cylindrical chamber in a direction generally tangential to the walls thereof to impart a generally circuitous flow to said gas and thereby subjecting said gas to centrifugal force, and a plurality of scrubber units arranged in series and adapted for the flow of said gas therethrough at progressively increasing velocities, the first of said units in the direction of gas flow communicating with the terminal end of said cylindrical chamber, each of said units comprising in the direction of gas flow therethrough an orifice plate provided with a plurality of closely-spaced orifices therein, an impact plate disposed in closely-spaced relation to said orifice plate and providing impact surfaces directly opposite said orifices, said impact plate having openings adjacent said impact surfaces for gas flow therethrough, and a collector plate provided with a plurality of closely-spaced relatively small openings for gas flow therethrough.

7. The separator of claim 6 wherein said orifice plate is 3/32 to 3/16 inch thick and the orifices provided therein are elongated slots 1/32 to 3/16 inch wide.

8. A separator for removing fine liquid particles from a gas, comprising a housing containing a cylindrical chamber and a plurality of scrubber units arranged in series and adapted for the flow of a gas therethrough at progressively increasing velocities; means for introducing said gas into said cylindrical chamber in a direction generally tangential to the walls thereof to impart a generally circuitous flow to said gas and thereby subjecting said gas to centrifugal force; the first of said units in the direction of gas flow communicating with the terminal end of said cylindrical chamber and each of said units comprising in the direction of gas flow therethrough an orifice plate provided with a plurality of closely-spaced orifices therein, an impact plate disposed in closely-spaced relation to said orifice plate and providing impact surfaces directly opposite said orifices, said impact plate having openings adjacent said impact surfaces for gas flow therethrough, and a plurality of perforated collector plates disposed in closely-spaced relation to said impact plate and to each other; an outlet in said housing for discharging said gas after flow through the last of said units; and means for collecting the liquid removed from said gas by said units.

9. The separator of claim 8 wherein said collector plates are spaced from said impact plate and from each other by not more than 1/4 inch, and the perforations of said collector plates are aligned in the direction of gas flow therethrough.

10. A separator for removing fine liquid particles from a gas, comprising a plurality of scrubber units arranged in series and adapted for the flow of a gas therethrough at progressively increasing velocities; each unit comprising in the direction of gas flow therethrough an orifice plate provided with a plurality of closely-spaced orifices therein, an impact plate disposed in closely-spaced parallel relation to said orifice plate and providing impact surfaces directly opposite said orifices, said impact plate having openings adjacent said impact surfaces for gas flow therethrough, and a perforated collector plate disposed in closely-spaced parallel relation to said impact plate; an inlet in said housing for the flow of said gas to the first of said units; an outlet in said housing for the discharge of said gas from the last of said units; and means for draining liquid coalesced on the plates of said units.

11. The separator of claim 10 wherein said orifice plate is $3/32$ to $3/16$ inch thick and the orifices provided therein are elongated slots $1/32$ to $3/16$ inch wide.

12. The separator of claim 11 wherein said perforated collector plate has an identical perforated collector plate disposed in closely-spaced parallel relation thereto, and the perforations of the parallel collector plates are not more than $1/4$ inch in diameter and are aligned in the direction of gas flow.

References Cited in the file of this patent
UNITED STATES PATENTS

| | | |
|---|---|---|
| 718,805 | Watts | Jan. 20, 1903 |
| 1,389,101 | Ohrvall | Aug. 30, 1921 |
| 2,116,085 | Van Berkel | May 3, 1938 |